Sept. 25, 1956 — C. W. GADD — 2,764,136
ENGINE OIL PAN
Filed Jan. 27, 1954

INVENTOR
Charles W. Gadd
BY L. D. Burch

United States Patent Office 2,764,136
Patented Sept. 25, 1956

2,764,136
ENGINE OIL PAN

Charles W. Gadd, Orchard Lake, Mich., assignor to General Motors Corporation, Detroit, Mich., a corporation of Delaware Application January 27, 1954, Serial No. 406,420

14 Claims. (Cl. 121—194)

This invention relates to engines and like devices, and more particularly to vibration damping means in oil pans for internal combustion engines.

Internal combustion engines operating at high R. P. M. and under high compression ratios, and particularly engines of this type operating on conventional gasoline, transmit rapid distortions or vibrations to the engine crankcase. A thin walled oil pan is normally mounted on the underside of the engine crankcase, and the relatively stiff portions of the oil pan, in reacting to these vibrations, produce objectionable noises. This occurs even when a thin gasket separates the crankcase and the oil pan to provide a lubricant seal. It has been found that this usually takes place to the greatest extent in the rear areas of the oil pan, inasmuch as they are sufficiently stiff to tune to the crankcase vibrations.

Various means have been devised to damp these vibrations, or to isolate the pan from the crankcase. Stiffening ribs provided in the oil pan structure do not materially alleviate the problem. Resilient gaskets formed from rubber or similar material and inserted between the oil pan and the crankcase are objectionable because they are subject to mechanical failure, or to deterioration due to chemical action of the lubricant. Forming the oil pan with heavy sections, as by casting, is also objectionable due to increased weight and cost.

It is now proposed to provide inexpensive vibration damping means of a permanent indestructible nature for more cheaply formed oil pans or the like have thin walls. This is to be accomplished by applying additional sections or layers at appropriate positions on the walls of the oil pan so that the vibrating walls of the oil pan will rub or contact these additional sections. Since the proposed means may be constructed from the same material as the oil pan and constitutes an integral portion of the same, the necessity for providing and periodically replacing resilient gaskets and the like is avoided.

Figure 1:
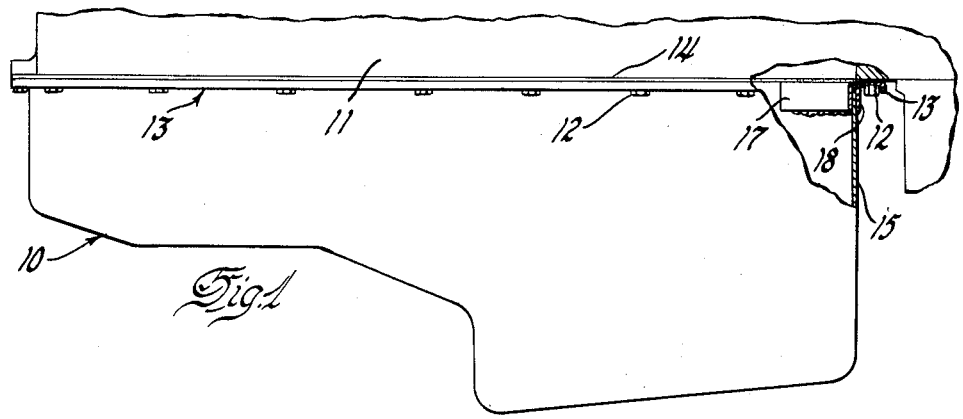
Figure 1 is a fragmentary side elevational view of an oil pan and crankcase assembly embodying the invention, with portions thereof broken away and in section to better illustrate the details of construction.

Referring to the drawings in more detail, an oil pan 10 is mounted on the underside of a crankcase 11 by means of bolts 12 passing through flange 13. A thin gasket 14 may be inserted to provide a lubricant seal between oil pan 10 and crankcase 11.

Figure 2:
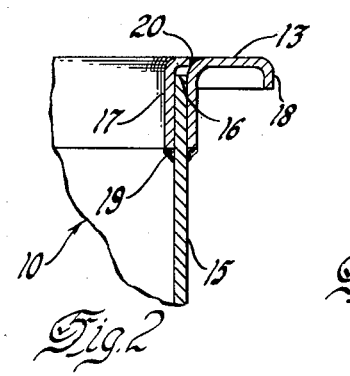
Figure 2 is an enlarged fragmentary view of the portion of an oil pan shown in cross-section by the right hand portion of Figure 1.

Because it has been found that gasket 14 is not sufficient to satisfactorily dampen vibrations and the resultant oil pan noises, wall 15 of oil pan 10 may be constructed so as to terminate at end 16, as shown by Figure 2. The flange 13 may be formed from flanged member 17 and a second flanged member 18, which may be secured together and to wall 15 in any suitable manner as by welds 19 and 20. It will be observed that vibrations occurring in members 17 and 18 will be dampened by rubbing or contact with the portion of wall 15 between end 16 and welds 19. It will be noted, also, that the construction of flange 13 above described may be limited to portions only of the oil pan, wherever it is considered necessary to dampen vibrations. This may depend upon many factors and may vary with each individual engine.

Figure 3:
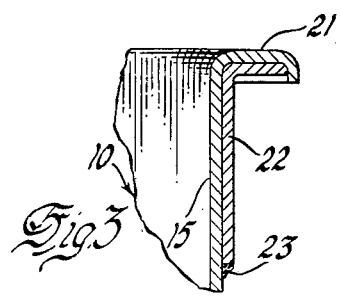
Figure 3 illustrates a modification of the same portion of an oil pan as shown by Figure 2.

In the modification shown by Figure 3, flange 21, corresponding to flange 13 shown by Figure 2, is a continuous portion of wall 15 of oil pan 10. To provide rubbing or vibration dampening surfaces, flanged member 22 may be secured to the outside of the crankcase 10 at an appropriate position thereon by means of a weld 23. Thus, any vibrations occurring in flange 21 and transmitted to wall 15 will be dampened by interference or rubbing with flanged member 22.

Figure 4:
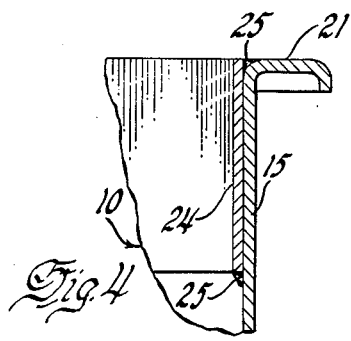
Figure 4 illustrates another modification of the same portion of an oil pan as shown by Figure 2.

In the modification shown by Figure 4, flat member 24 may be suitably secured to an appropriate inside surface of oil pan 10, as by welds 25. Any vibrations occurring in flange 21 and transmitted to wall 15 will be dampened by rubbing or interference with member 24.

Figure 5:
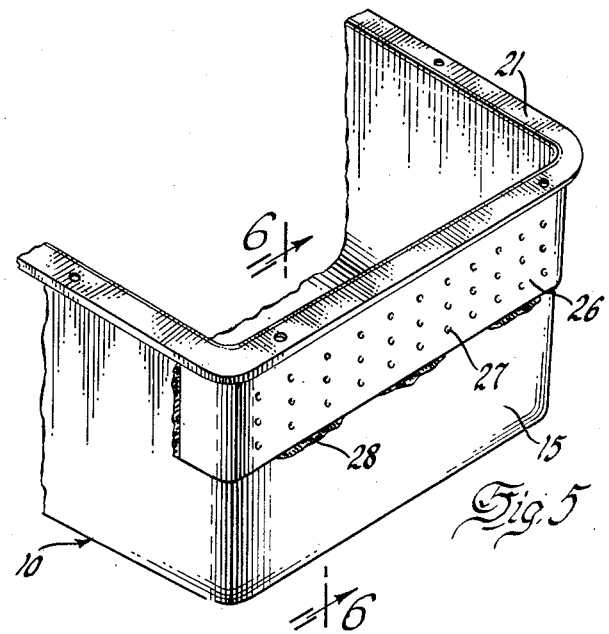
Figure 5 is a fragmentary perspective view of an oil pan illustrating still another embodiment of the invention.
Figure 6:
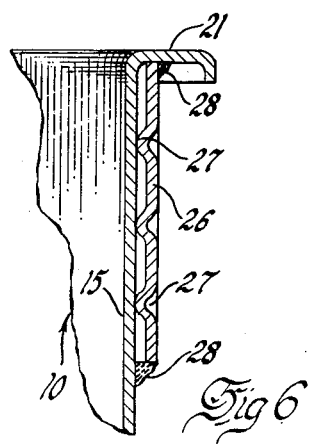
Figure 6 is a fragmentary cross-sectional view taken along the plane of line 6—6 of Figure 5, and looking in the direction of the arrows.

In the modification shown by Figures 5 and 6, member 26 may be suitably secured to oil pan 10 against projections 27 by welds 28. Vibrations occurring in flange 21 and transmitted to wall 15 will be dampened by interference with member 26 through projections 27.

It will be observed from the foregoing drawings and description that there has been provided means of a permanent and indestructible nature for dampening vibrations and resulting objectionable noises, especially in more cheaply formed oil pans and the like for internal combustion engines and like devices. To practice the invention, one need only locate the point at which vibrations occur and provide at that point an additional thickness or wall capable of rubbing or interfering with the vibrating wall.

What is claimed is:

1. An oil pan for internal combustion engines or the like, comprising a thin walled container subject to vibration, said container having an open side and being adapted to be secured to the underside of a vibrating crankcase and said container having vibration damping means associated with the rear portions thereof, said means comprising double wall portions of said container having substantially the same thicknesses positioned near the juncture of said container and said crankcase.

2. An oil pan for internal combustion engines or the like, comprising a thin walled container subject to vibration, said container having an open side and being adapted to be secured to the underside of a vibrating crankcase and said container having vibration damping means associated with the rear portions thereof, said means comprising double wall portions of said container.

3. An oil pan for internal combustion engines or the like, comprising a stiff walled container subject to vibration, said container having an open side and being adapted to be secured to the underside of a vibrating crankcase and said container having vibration damping means associated only with the rear portions thereof, said means comprising lapped multiple wall portions of said container having substantially the same thicknesses positioned at the maximum points of vibration of said container.

4. An oil pan for internal combustion engines or the like, comprising a container having walls subject to vibration and said container having an open side adapted to be secured to the underside of a crankcase, said container having vibration damping means associated only with the rear portions thereof, said means comprising lapped double wall portions of said container positioned near the juncture of said container and said crankcase.

5. An oil pan for internal combustion engines or the like, comprising a container having thin walls subject to vibration and said container having an open side adapted to be secured to the underside of a crankcase, said container having vibration damping means associated with the rear end and side walls thereof, said means comprising spaced double wall portions of said container having substantially the same thicknesses positioned near the juncture of said container and said crankcase.

6. An oil pan for internal combustion engines or the like, comprising a container having walls subject to vibration and said container having an open side adapted to be secured to the underside of a crankcase, said container having vibration damping means associated with the rear side walls thereof, said means comprising lapped triple wall portions of said container positioned near the juncture of said container and said crankcase, the intermediate wall being the integral side wall of said container.

7. Vibration damping means for an engine oil pan or similar device, said means comprising additional layers having substantially the same thickness as the walls of said pan applied to the rear end and side walls of said pan near the juncture of said pan with said engine, said layers comprising the same material as said walls and being firmly secured along the edges thereof to said walls.

8. An oil pan for internal combustion engines and the like, comprising a container having walls subject to vibration and having an open side adapted to be secured to said engine, said container having lapped multiple walled sections thereof of substantially the same thickness as the walls of said pan near the rear juncture of said container and said engine to damp noises due to vibration transmitted from said engine to said container.

9. An oil pan construction, comprising a container having bottom and side walls, some portions of said side walls having an integral flange extending laterally therefrom, other portions of said side walls having a separate flange secured thereto, said separate flange having spaced walls receiving said oil pan side walls therebetween.

10. An engine construction including a crankcase and an oil pan adapted to be secured to said crankcase, comprising a container having bottom and side walls, some portions of said side walls having an integral flange extending laterally therefrom, other portions of said side walls having a separate flange secured thereto, said separate flange having spaced walls receiving said oil pan side walls therebetween.

11. An oil pan construction, comprising a container having bottom and side walls, some portions of said side walls having an integral flange extending laterally therefrom, other portions of said side walls disposed at the rear of said oil pan having a separate flange secured thereto, said separate flange having spaced walls receiving said oil pan side walls therebetween.

12. An oil pan, comprising a container having a bottom wall, side walls extending from said bottom wall, an open top and a bolting flange extending laterally from said side walls at said open top, some portions of said flange being formed integrally with said side walls, other portions of said flange being separately provided, said separately provided flange portions having spaced walls receiving said side walls therebetween and being secured thereto.

13. An engine construction including a crankcase and an oil pan adapted to be secured to said crankcase, comprising a container having a bottom wall, side walls extending from said bottom wall, an open top and a bolting flange extending laterally from said side walls at said open top, some portions of said flange being formed integrally with said side walls, other portions of said flange being separately provided, said separately provided flange portions having spaced walls receiving said side walls therebetween and being secured thereto.

14. An oil pan comprising a container having a bottom wall, side walls extending from said bottom, an open top and a bolting flange extending laterally from said side walls at said open top, some portions of said flange being formed integrally with said side walls, other portions of said flange disposed at the rear of said oil pan being separately provided, said separately provided flange portions having spaced walls receiving said side walls therebetween and being secured thereto.

References Cited in the file of this patent
UNITED STATES PATENTS

| | | |
|---|---|---|
| 1,737,466 | Lynd | Nov. 26, 1929 |
| 1,945,245 | Whyte | Jan. 30, 1934 |
| 1,974,562 | Dodge | Sept. 25, 1934 |
| 2,002,211 | Torney | May 21, 1935 |